(12) United States Patent
Johnson

(10) Patent No.: US 9,085,929 B2
(45) Date of Patent: Jul. 21, 2015

(54) METHOD, SYSTEM AND APPARATUS FOR ELECTRONICALLY TINTING WINDOWS

(76) Inventor: Rome Johnson, San Jose, CA (US)

(*) Notice: Subject to any disclaimer, the term of this patent is extended or adjusted under 35 U.S.C. 154(b) by 261 days.

(21) Appl. No.: 13/594,358

(22) Filed: Aug. 24, 2012

(65) Prior Publication Data

US 2014/0055831 A1 Feb. 27, 2014

(51) Int. Cl.
*G02F 1/153* (2006.01)
*E06B 9/24* (2006.01)

(52) U.S. Cl.
CPC ........... *E06B 9/24* (2013.01); *E06B 2009/2464* (2013.01)

(58) Field of Classification Search
USPC .......................................... 359/238, 275, 900
See application file for complete search history.

(56) References Cited

U.S. PATENT DOCUMENTS

2003/0210355 A1* 11/2003 Dao ................................ 349/16

OTHER PUBLICATIONS

Tony Pimpo, Tint At the Touch of A Button: Mercedes Magic Sky Control, Apr. 26, 2012, http://www.automoblog.net/2012/04/26/tint-at-the-touch-of-a-button-mercedes-magic-sky-control/.
2012 Mercedes-Benz SLK 350 with Magic Sky Control, Jun. 23, 2011, http://www.youtube.com/watch?v=9pxGrtV2Mbg.
Mercedes-Benz SL Magic Sky Control Using SPD-SmartGlass Technology, Dec. 15, 2011, http://www.youtube.com/watch?v=o3n1tlQ5D6Q.
Electrochromic Car Window Film, Jul. 5, 2009, http://www.youtube.com/watch?v=AU6m5mBgk24.
Vario Plus Window "Tint", Feb. 8, 2010, http://www.youtube.com/watch?v=5NbiHhHrnvM&feature=related.

* cited by examiner

*Primary Examiner* — Jack Dinh
(74) *Attorney, Agent, or Firm* — Maier & Maier, PLLC

(57) ABSTRACT

A method and apparatus for darkening or tinting windows may be described. The method and apparatus can include coupling a display to a window; coupling the display to a power source; sending a signal from a controller to the display, and changing the display properties of the display with the signal sent from the controller to adjust the transparency of the display.

12 Claims, 4 Drawing Sheets

METHOD, SYSTEM AND APPARATUS FOR ELECTRONICALLY TINTING WINDOWS

BACKGROUND

Conventional manners of tinting glass include the use of a film that is applied to a sheet of glass, for example a car window. Tinting a glass surface can be desirable for a variety of reasons, such as reducing the amount of sunlight that enters an area behind the glass, for example to keep a car or building cooler. The tint may also be used to enhance security, for example by preventing people outside of the tinted area from seeing or viewing the contents or activities within the tinted area. Additionally, tint can be used to improve the aesthetics or attractiveness of an item onto which tint is applied, for example making a car have a desired appearance.

Tinting can be performed in several manners. One example is treated or colored glass. In the case of automobiles or other applications, such glass is typically factory manufactured at a higher cost than regular, untinted glass. Another manner of tinting glass is the use of tinting film. The film is coupled to the glass with an adhesive and is smoothed to provide a uniform appearance. The tint level for these manners of tinting, however, is static and new treated glass or a new tint needs to be applied if a change in the desired level of tint is desired.

Additionally, the tinting can suffer from a variety of drawbacks after its application. Bubbles in the tint can form as a result of improper application of tinting film. This can be aesthetically displeasing as well as negatively affect the desired purpose of the tint. Tinting film can also degrade over time, decreasing its effectiveness. Further, treated or tinted glass can be expensive to manufacture or procure. Additionally, if a level of tint applied becomes undesirable, changing the level of tint requires removal or replacement.

SUMMARY

An exemplary embodiment may describe a method for darkening or tinting windows may be described. The method and apparatus can include coupling a display to a window; coupling the display to a power source; sending a signal from a controller to the display, and changing the display properties of the display with the signal sent from the controller to adjust the transparency of the display.

Another exemplary embodiment may describe an apparatus for tinting or darkening windows. The apparatus may include a window mounted in a frame; a flexible display adhesively coupled to the window; a display module electronically coupled to the display; a controller electronically coupled to the display module; and a power source electronically coupled to the controller, the power source providing power to the display through the control module and the controller regulating the signal sent to the display module that adjustably varies the darkness of the display adhesively coupled to the window.

BRIEF DESCRIPTION OF THE DRAWINGS

The present embodiments are illustrated by way of example and not limitation in the figures of the accompanying drawings, in which like references indicate similar elements and in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Referring generally to FIGS. 1-4, embodiments disclosed herein describe methods, systems and apparatuses for providing tint. In exemplary embodiments, a powered display or displays, such as a flexible liquid crystal display or known variations thereof, may be coupled with one or more glass surfaces, such as a window. The display or displays may be substantially transparent in an unpowered state. Further, a controller coupled with the display or displays may be capable of varying the level of transparency, or tint, of the display or displays.

Figure 1:
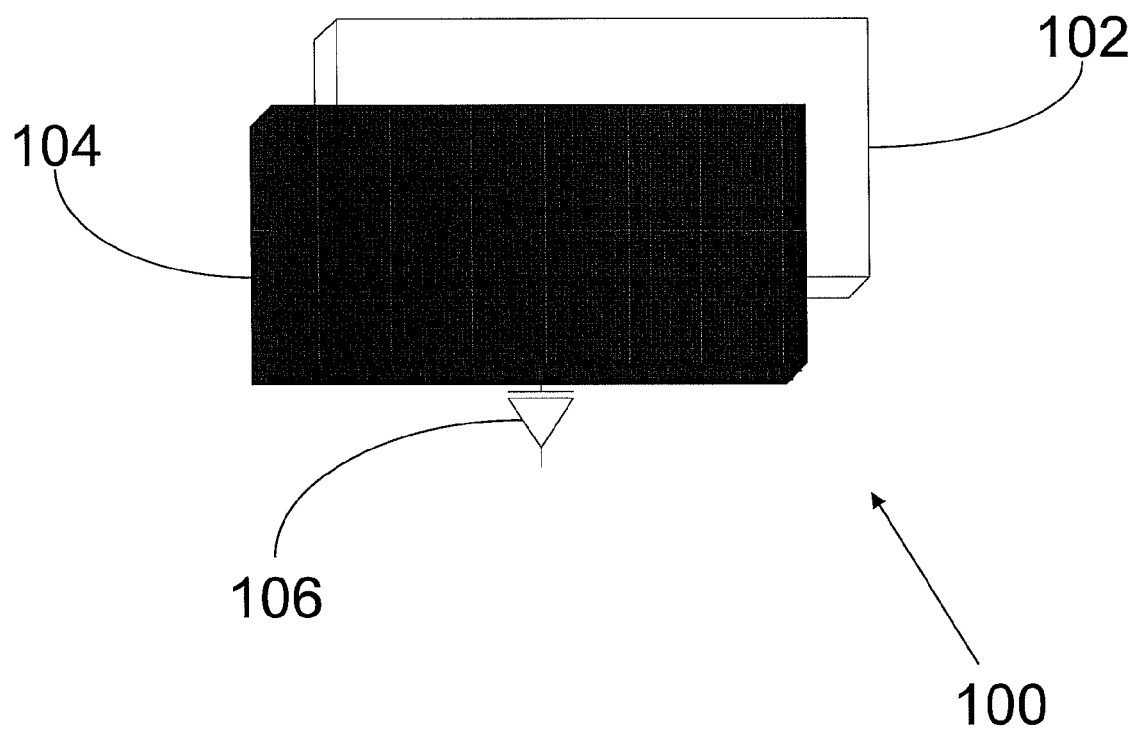
FIG. 1 illustrates an exemplary diagram of a display and a window.

Referring now to exemplary FIG. 1, a tinting apparatus may be shown. Tinting apparatus 100 may include a window 102 and a display 104. The window 102 may be any type of window, for example an automobile window, a window on a building or any other type of window. Although many of the exemplary embodiments described herein may relate to one or more automobile windows, it may be appreciated that the methods, systems and apparatuses described herein could be applied to any window or other surface where tinting or a change in the visual characteristics of the window or other surface may be desired. The window 102 may be formed and shaped in any known manner, as desired. Additionally, window 102 may be mounted or actuated in any desired manner, for example mounted on or with a door and door frame of an automobile and actuated in an electrical manner, mechanical manner or any combination thereof.

Still referring to exemplary FIG. 1, window 102 may have a display 104 coupled thereto. Display 104 may be coupled to all of window 102 or any desired portion thereof. Display 104 may be coupled with window 102 in any desired fashion, including, but not limited to, adhesives, mechanical couplings and the like. Display 104 may be mounted on an interior portion of a window or an exterior portion of a window, as desired. Display 104 may be a substantially durable and flexible display that may be shaped into any desired form. Such displays commonly include, but are not limited flexible liquid crystal displays (LCDs), flexible organic light-emitting diode displays (OLEDs), active-matrix organic light-emitting diode displays (AMOLEDs) and the like. Such displays are known to be substantially flexible, so as to allow for mounting to a curved surface. Additionally, many of these displays are thin and highly resilient to damage, for example scratches or impact damage. Further, such displays may be powered or charged and then retain an image thereon even after the power or charge is removed from the display. This may be beneficial for use when, for example, an automobile is turned off and parked. Additionally, the displays can provide for any type of image or coloring as desired, including, but not limited to black or shades of black, static color images, dynamic or moving color images, or any other desired color or image. For example any desired colors or combination of colors may be used, image data may be displayed, advertisement data, logo data may be displayed or any other desired information or data may be displayed on any desire portion of display 104. This could include, for example, the display of a company logo on a desired portion of the display 104. Additionally displayed information may be displayed outwardly, for example in the form of an advertisement that is viewable outside of a vehicle or building on which display 104 is utilized. Additionally, display 104 may be such that its displayed tint or data may be such that it complies with any local rules or regulations, for example a state law on a percentage of allowable tint that may be utilized on an automobile window.

In still further exemplary embodiments, display 104 may be wholly or substantially transparent. Such displays may be further examples of the LCD, OLED, and AMOLED displays discussed above. Further, display 104 may be powered in any known manner. For example, display 104 may include module, harness or connector 106. Module 106 may provide incoming power to drive display 104. Additionally, as shown in more detail below, module 106 may be coupled with a central control unit and a power source. In some exemplary embodiments, module 106 may be coupled to display 104 using an adhesive or magnetic coupling. Additionally module 106 may receive or transmit data or power in a wired or wireless fashion to and from a central control unit and to and from display 104.

In a further exemplary embodiment, display 104 may be formed in any of a variety of shapes and sizes. For example, display 104 may be shaped to fit windows having certain dimensions so as to substantially cover the entirety of an interior or exterior portion of the window. Additionally, display 104 may be shaped so as to couple with an automobile window on a specific make and model of an automobile. Additionally, groupings of displays may be formed and packaged together so as to substantially fit any number of windows on a specific make and model of automobile.

Figure 2:
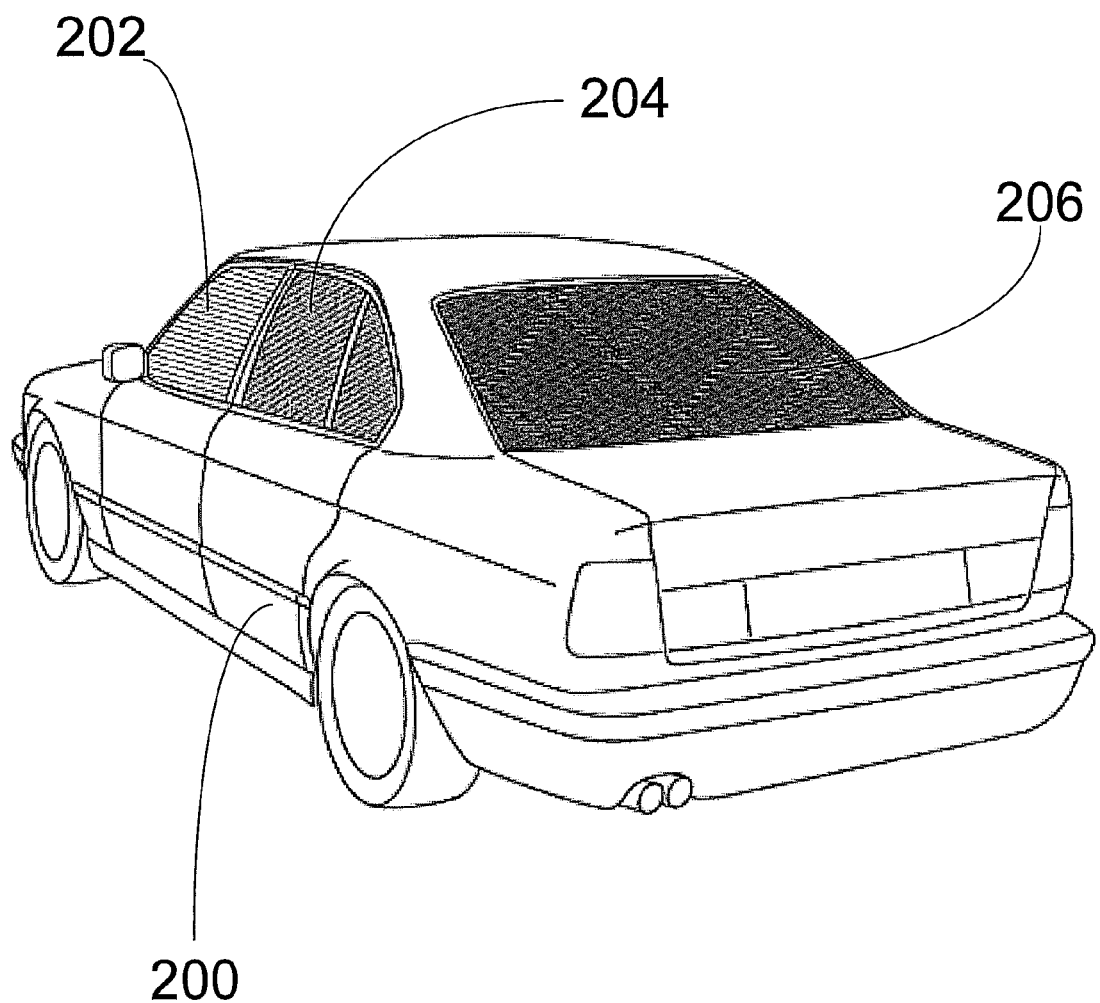
FIG. 2 illustrates an exemplary diagram of displays coupled with windows on an automobile.

Referring now to exemplary FIG. 2, windows with associated displays on an automobile 200 may be shown. In this example three windows with displays coupled thereto, 202, 204 and 206, may be shown. Such windows may now be able to provide varying levels or tint or an alternative display thereon. In one exemplary embodiment window and display 202 may be substantially transparent or have a very low level of darkness or tint. This may be a result of display (such as display 104 described above) either not being powered or being powered in such a fashion that the display remains substantially transparent. Window and display 204, however, shows the display on the window where there is a level of power provided that substantially and effectively provides a tint, darkness or shading to the window. This may be a desired setting that a user or operator has chosen to reduce glare, reduce inward visibility or enhance security. In still another exemplary embodiment shown in FIG. 2, window and display 206 may be powered such that the window appears substantially darker or opaque. Additionally, as may be appreciated, display in any of these exemplary embodiments may be powered at any desired level to provide any desired level of tint or transparency, for example ranging from substantially transparent to substantially opaque.

Figure 3:
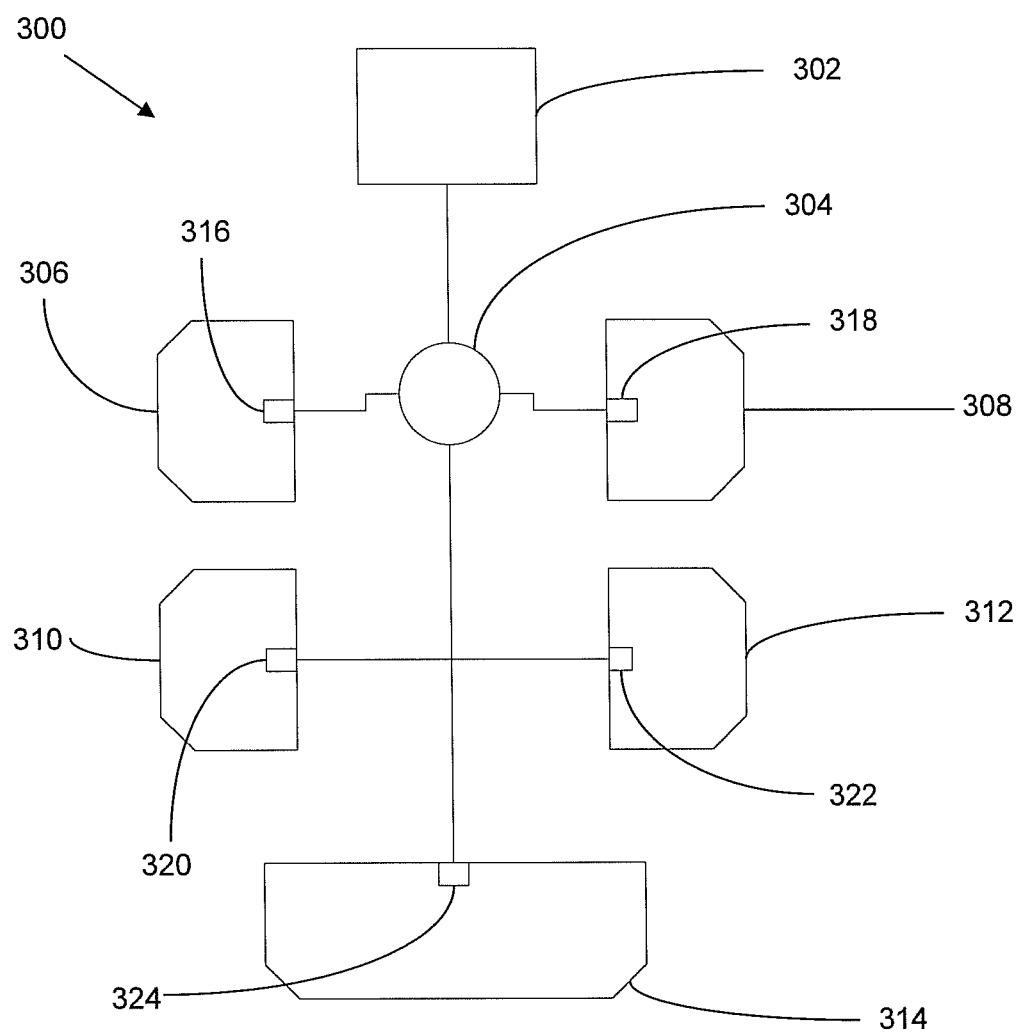
FIG. 3 illustrates an exemplary schematic for window darkening or tinting.

Referring now to exemplary FIG. 3, a configuration 300 of an automobile equipped with a number of displays that are associated with windows may be shown. In this exemplary embodiment the displays (306, 308, 310, 312 and 314) may be coupled to or mounted on windows, as described with previous exemplary embodiments. A power source 302 may connected with each of displays 306-312 as well as to controller 304. The power source may further be coupled with a wiring harness or module associated with each display. These modules can include module 316 on display 306, module 318 on display 308, module 320 on display 310, module 322 on display 312 and module 324 on display 314. Modules 316 through 324 may be used to provide power or data, in a wired or wireless fashion, to displays 306 through 314, regulate power or perform any other desired function associated with driving the displays. Power source 302 may be any desired form of power source, for example a 12V power source, or any other power source associated with an automobile that may be capable of powering any primary or auxiliary items associated with the automobile. In some other exemplary embodiments, the power source 302 may be a solar power source coupled with or otherwise connected to an automobile. Power source 302 may further be such that it can be regulated to provide a desired amount of power or voltage to any of displays 306 through 314.

Still referring to exemplary FIG. 3, controller 304 may act as a central control unit for the configuration 300. Controller 304 can include a voltage adjuster or regulator that can be used to activate, deactivate or adjust displays 306 through 314. In one exemplary embodiment, the adjuster or regulator may be a knob that allows for a substantially broad range of variations to be made to displays 306 through 314, for example adjusting the tint or darkness of the displays. In another exemplary embodiment, controller 304 may include any number of buttons that may be used to activate, deactivate or adjust displays 306 through 314. For example a first button may be pressed to power or tint display 306, a second button may be pressed to power display 308 and so forth. Similarly, any number of different knobs or other controls may be utilized to control any of displays 306 through 314 individually or collectively. Further, other known types of control or adjustment devices or mechanisms, such as, but not limited to, touch screen displays, may be utilized with or as controller 304. In still other exemplary embodiments, controller 304 may be integrated with any other control functions found in an automobile. Similarly, in exemplary embodiments where a number of displays are associated with windows or doors on a house or building, a central control unit may be utilized to control an individual display, all displays or any number of displays, as desired. In such examples, the controller may be a stand-alone unit or may be integrated with another device, such as a computer-controlled thermostat, home computer or the like.

In operation, the displays 306 through 312 may be operated or adjusted as desired. Similar to the previous exemplary embodiments, each display may be operated so as to darken any desired amount. This may allow for the windows to have a tinted effect and may result in any of the benefits of tinting. Further, as desired, one or more of the displays 306 through 314 may be darkened or tinted to any desired level independently of any other display. For example it may be desired to have displays 306 and 308 have a lower level of tint or darkness whereas displays 310, 312 and/or 314 have a greater degree of darkness or tint. However, it may be appreciated that any desired adjustments may be made to any desired display or displays 306 through 314 at any time. Further, it should be appreciated that any number of displays may be associated with controller 304, for example a building having a large number of windows with displays associated therewith.

Figure 4:
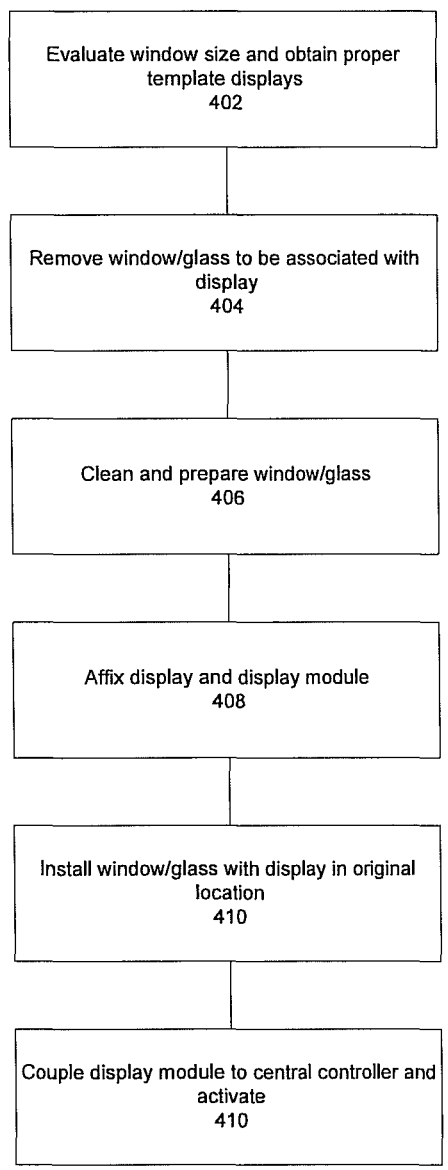
FIG. 4 illustrates an exemplary flowchart for darkening or tinting windows.

In a further exemplary embodiment, and referring now to FIG. 4, a method of utilizing displays with windows or glass may be described. In step 402 the size and types of windows may be evaluated and the appropriate displays may then be obtained. For applications such as automobiles, a wide variety of templates associated with installation kits may be available. For example a kit containing display templates that are sized properly to the windows of a specific year, make and model of an automobile may be obtained. Such a kit could contain the appropriately sized displays, a mounting or coupling mechanism (such as adhesive) used to couple the displays to a window, display modules for the displays, a controller and any desired wiring or hardware that can be utilized to install the displays and put them into an operable state.

In step 404 the windows or glass onto which the displays are to be mounted or coupled may be removed from their fitting and location. In the embodiments regarding automobiles, the windows may be removed from a door or door frame. In embodiments related to housing or buildings, the glass may be removed from a window frame. Then, in step 406, the window or glass may be cleaned and prepared, as desired. This can include the removal of any dirt or cleaning of the window, the elimination of any abrasions or imperfections in the window or any other manner of smoothing or preparing the window. Such a step may be desired in order to provide for a more consistent application or coupling of a display to the glass of a window.

In step 408, a display may be affixed to the window. As described previously, this can include the use of a known adhesive to couple the display to a window or any other desired manner of mounting, affixing or coupling the display to the window. As the display may have been formed to the shape of the window onto which it is being coupled, any cutting or otherwise shaping the display may not be necessary. However, it can be appreciated that kits may be provided that allow a user to cut or shape a display in any manner desired. Additionally, the coupling or mounting of the display may be such that it is applied smoothly to the window, for example without any air bubbles or other imperfections that may prevent the display on the window from being substantially transparent when mounted in an unpowered state. Further, in step 408, a module associated with the display, for example a wiring harness, may be included on the display template to be mounted or may otherwise be coupled to the display at that time.

In step 410, a window onto which a display has been mounted may then be reinstalled into its original or desired location. As the display mounted on a window may be substantially thin, for example a few millimeters, the reinstallation of the window into an original location may not require any refitting or changing of the original location. However, a user could refit the window in any desired manner.

In step 412, the display may be wired and connected to a central controller and power source. A kit with template displays may be such that it is substantially plug and play. For example, after a window with a display is mounted in an automobile, the display module may be connected, for example using wires, to a controller, such as controller 304 described in exemplary FIG. 3. The controller 304, which may also be included in a kit, may then be connected to a power source, such as power source 302 described in exemplary FIG. 3. Upon completion of these connections, the system may be substantially active and may allow for a user to operate the displays in any of the exemplary manners described above.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for tinting windows, comprising:
coupling a display to a window;
coupling the display to a power source;
coupling at least a second display to at least a second window;
coupling the at least one second display to the power source;
sending a first signal from a controller to the display and a second signal from the controller to the at least a second display; and
changing the display properties of the display with the first signal sent from the controller to adjust the transparency of the display and changing the display properties of the at least a second display with the second signal sent from the controller to adjust the transparency of the at least a second display.

2. The method of claim 1, further comprising adjusting the transparency of the display with a signal that raises and lowers the transparency of the display.

3. The method of claim 1, further comprising adhering the display to the window.

4. The method of claim 1, further comprising forming the display in the shape of a window.

5. The method of claim 1, further comprising forming the display in the shape of an automobile window.

6. The method of claim 1, further comprising coupling the display to the power source through a display module mounted on the display.

7. The method of claim 1, further comprising disconnecting the display from the power source and maintaining a desired level of transparency on the display.

8. An apparatus for electronically darkening windows, comprising:
- a window mounted in a frame;
- a flexible display adhesively coupled to the window;
- a display module electronically coupled to the display;
- at least a second window mounted in a second frame;
- at least a second display adhesively coupled to the at least a second window;
- at least a second display module electronically coupled to the at least a second display;
- a controller electronically coupled to the display module and the at least a second display module; and
- a power source electronically coupled to the controller, the power source providing power to the display and at least a second display through the control module and the controller regulating a plurality of signals sent to the display module and the at least a second display module that adjustably varies the darkness of the display adhesively coupled to the window, and the second display adhesively coupled to the at least a second window, respectively.

9. The apparatus of claim 8, further comprising one or more control mechanisms on the controller used to adjust the signal sent to the display module.

10. The apparatus of claim 8, wherein the display is one of an LCD, OLED, and AMOLED.

11. The apparatus of claim 8, further comprising a plurality of displays coupled to the controller, wherein the controller adjustably varies the darkness of the plurality of displays.

12. The apparatus of claim 11, further comprising a central processing unit that independently adjustably varies the darkness of each of the plurality of displays.

* * * * *